(12) United States Patent
Paternostre et al.

(10) Patent No.: US 10,492,390 B2
(45) Date of Patent: Dec. 3, 2019

(54) HYDROPONIC DISPLAY CONTAINER FOR FLOWERING BULBS

(71) Applicant: Bloomaker USA, Inc., Waynesboro, VA (US)

(72) Inventors: Joep Paternostre, Waynesboro, VA (US); Gilles Paternostre, Waynesboro, VA (US); Reinier Smit, Waynesboro, VA (US); Dennis H Owens, Richmond, VA (US)

(73) Assignee: Bloomaker USA, Inc., Waynesboro, VA (US)

( * ) Notice: Subject to any disclaimer, the term of this patent is extended or adjusted under 35 U.S.C. 154(b) by 166 days.

(21) Appl. No.: 15/720,908

(22) Filed: Sep. 29, 2017

(65) Prior Publication Data

US 2019/0098847 A1 Apr. 4, 2019

(51) Int. Cl.
*A01G 31/02* (2006.01)
*A01G 9/02* (2018.01)

(52) U.S. Cl.
CPC ............. *A01G 31/02* (2013.01); *A01G 9/028* (2013.01)

(58) Field of Classification Search
CPC .......... A01G 31/02; A01G 9/02; A01G 9/022; A01G 9/028; A01G 9/0297
USPC ..... 47/60, 63, 65.5, 65.7, 66.1, 66.5, 84, 85, 47/86
See application file for complete search history.

(56) References Cited

U.S. PATENT DOCUMENTS

| | | | |
|---|---|---|---|
| 611,523 A | 9/1898 | Springer | |
| 1,499,165 A | 6/1924 | France | |
| 1,826,547 A | 10/1931 | Jackson | |
| 1,959,510 A | 5/1934 | Van Waveren | |
| 2,189,982 A | 2/1940 | Haglund | |
| 2,930,162 A | 3/1960 | Mulford | |
| 3,245,175 A | 4/1966 | Klingberg | |
| 3,529,531 A | 9/1970 | Swett | |
| 4,106,235 A | 8/1978 | Smith | |
| 4,249,341 A * | 2/1981 | Huegli | A01G 31/02 47/14 |

(Continued)

FOREIGN PATENT DOCUMENTS

| | | | | |
|---|---|---|---|---|
| CA | 2328531 A1 * | 6/2001 | ............. | A01G 9/028 |
| JP | 2002186362 A * | 7/2002 | ............... | A01G 9/02 |

*Primary Examiner* — Kathleen I Alker
(74) *Attorney, Agent, or Firm* — Daniel L. Fitch; Ginger T. Chapman (57) ABSTRACT

A system and device used to promote healthy growth and reduce damage to hydroponically grown flower bulbs during their transportation, storage and display. A transparent container is adapted and arranged with a support device and a snap-fit cover which act to reduce movement of fluids within the container in transit, thereby reducing spillage and minimizing damage to the flower bulbs. The support device contains a plurality of recessed inserts to secure flowers in an upright position and accommodate bulb growth without causing damage to the bulb. The snap-fit cover creates a reservoir chamber which prevents fluid from spilling out of the container if the container is tipped or subjected to unpredictable forces or motion during transportation. The hydroponic container is ready to be displayed and marketed as soon as it is shipped from the distributor, thereby minimizing retailer and consumer involvement and expenditure of time.

11 Claims, 9 Drawing Sheets

(56) References Cited

U.S. PATENT DOCUMENTS

| | | | |
|---|---|---|---|
| 4,299,054 A * | 11/1981 | Ware | A01G 31/02 47/56 |
| 4,328,641 A | 5/1982 | Tesch | |
| 4,860,491 A | 8/1989 | Panuski | |
| 4,926,584 A | 5/1990 | Horibata | |
| 5,060,420 A | 12/1991 | Bergman | |
| 5,097,627 A | 3/1992 | Roberts | |
| 5,225,342 A * | 7/1993 | Farrell | A01G 5/06 435/430 |
| 5,287,651 A | 2/1994 | de Graaf | |
| 5,448,854 A | 9/1995 | Hirsch et al. | |
| 5,704,162 A * | 1/1998 | Holtkamp, Jr. | A01G 27/04 47/79 |
| 6,038,814 A | 3/2000 | Miotto | |
| 6,202,349 B1 | 3/2001 | Kanagawa et al. | |
| 6,401,386 B1 | 6/2002 | Ko | |
| 6,782,656 B2 | 8/2004 | Washburn | |
| 6,962,022 B2 | 11/2005 | Shannon | |
| 7,448,162 B2 | 11/2008 | Paternostre et al. | |
| 8,782,950 B2 * | 7/2014 | Miel | A01G 9/02 47/66.1 |
| 2003/0094289 A1 | 5/2003 | Groot et al. | |
| 2010/0147844 A1 | 6/2010 | Connell et al. | |
| 2012/0137581 A1 * | 6/2012 | Teasdale | A01G 31/02 47/66.6 |
| 2013/0291436 A1 * | 11/2013 | Stockman | A01G 9/02 47/81 |
| 2015/0027046 A1 * | 1/2015 | Adolf | A01G 9/02 47/65.5 |

\* cited by examiner

HYDROPONIC DISPLAY CONTAINER FOR FLOWERING BULBS

CROSS-REFERENCE TO RELATED APPLICATIONS

NONE

FEDERALLY SPONSORED RESEARCH

NONE

BACKGROUND

Field of Invention

This invention relates generally to the hydroponic growing of flowering bulbs. More particularly, this invention is an improved system used to promote healthy growth and reduce damage to bulbs during the transportation, storage, and display of hydroponically grown flowering bulbs.

Related Art

Hydroponics is a method of growing various plant species without the use of a soil medium. Commonly used medium for hydroponics include rockwool, gravel, sand, expanded clay aggregates, Perlite, Vermiculite, coconut fiber, water absorbing crystals, gels and inert materials that do not decay or break down quickly. The medium is used to support and secure the bulb during its growth while in a container. The root system of hydroponically grown plants must be in direct contact with a nourishing fluid, such as water. This direct contact results in smaller root systems since the roots do not need to grow longer to seek nutrients as they would typically in a soil based medium. With the plant devoting less energy on growth of nutrient-seeking root structure, the energy is instead devoted to vegetation and flower growth.

The methods and systems of hydroponic growing have evolved such that many variations of hydroponic arrangements now exist. The emerging commercial market for hydroponic flowers, such as hydroponically grown tulips, has introduced new challenges. Many popular flowering plants are grown from bulbs. Examples of flowering plants which are grown from bulbs include lilies, tulips, daffodils, hyacinths, narcissus, calla lilies, gladioli, amaryllis and caladiums. When hydroponically grown flower bulbs are transported, their root system must remain in contact with the life sustaining nourishing fluid in their shipping container. In some instances, hydroponically grown flowers are transported over long distances to reach a retailer or customer. During transportation, the shipping container must additionally secure the flower bulb in an upright position while retaining the hydroponic medium and nourishing fluid therein.

Shipping containers are subjected to unpredictable forces during transportation which cause corresponding movement of both the medium and nourishing fluid. Excessive movement of the nourishing fluid may create turbulence sufficient to cause damage to the plant. The root system is particularly vulnerable in hydroponics because it is not supported by a soil medium. Such turbulence may easily cause the fragile root system of hydroponically grown flowers to fracture. When the roots of a flowering bulb fracture they often release strands of natural fungi known as *Trichoderma* species. Fungal growth is visible through the transparent display pot and reduces the appeal and marketability of the flowers and container. This fungal release, in turn, causes the nourishing fluid to become cloudy and tainted resulting in harmful bacterial growth. Excessive movement of nourishing fluid may also cause the nourishing fluid to splash up on and soak the flower bulb. Too much moisture may cause mold to grow on the flower bulb which adversely affects both the appearance and healthy growth of the flower. To overcome these problems, it is necessary to control the movement of the medium and nourishing fluid during transportation. To this end, it is vital to secure the flower bulb in an upright position with its roots bathed in nourishing fluid in a manner that is less susceptible to excessive movement and associated turbulence.

The prior art discloses a variety of bulb growing devices and cultivating methods. For example, U.S. Patent Application Publication Number 2003/0094289 A1 discloses forcing racks suitable for large scale planting, storing and forcing of bulbs in tank farms prior to their wholesale and shipping to retailers. The forcing racks include plate-like bodies having holes therethrough into which flower bulbs are planted in arrays of 12×18 bulbs. The forcing racks further include flexible elements, such as teeth or fingers, which extend radially around the holes and clampingly receive the bulbs for planting and storage. These flexible elements bend in the opposite direction for removal of the forced bulbs prior to their sale and shipping. The racks are placed in garden frames in the tank farms; the rack assembly includes a bottom plate having legs or spacers corresponding to water levels in the tanks and an upper plate having handles fitted to or through the upper plate. The '289 Publication discloses support racks suitable for holding bulbs during their planting and storage phases prior to the wholesale of the flowering plants but does not however disclose support trays capable of being shipped or transported and does not disclose support trays capable of protecting bulbs from damage due to transportation. Finally, the '289 publication does not disclose cultivating flower bulbs during their display and marketing, and for the enjoyment of the end consumer.

U.S. Pat. No. 7,448,162 B2 discloses a system and method for displaying and observing the growth of flower bulbs in an indoor environment. The disclosure describes a support device formed with spikes interspersed across a top surface thereof and perforations that extend entirely through the device. Flower bulbs are pressed between the spikes and then the support device is placed in a rooting container which is deposited in a dark, cool environment for a time period corresponding to vegetative growth of the bulb. During this process, the basal of the bulb is not damaged; however the tunic and the scales of the bulb may easily be pierced. Once roots and sprouts develop on the bulb, the support device is removed from the rooting container and transferred to a display container. The display container inner wall surface may include a circular indentation shelf upon which the support device rests, or alternatively, the support device may include support legs to provide space for roots beneath the support device. The '162 support device is economically efficient and capable of being produced on a mass scale due to its simple, single piece construction. The '162 patent discloses support devices that permit nourishing liquids to flow freely therethrough in order to enhance the healthy growth of flowering bulbs during their display and marketing for sale to retailers. The '162 patent does not disclose support devices for controlling the movement of fluids within a container or prevention of turbulence and associated damage to flower bulbs during shipping, handling and transportation thereof. The disclosure suggests that spillage of liquid contents during shipment may be minimized by using tall enough containers and by clearly marking the shipping boxes to indicate the upright position in which the box should be placed during shipment. These methods however suffer from the drawback of increasing shipping costs by increasing the volume of the shipment boxes without a corresponding increase in the amount of goods shipped, and relying on the skill of cargo handlers.

Prior art attempts to solve the aforementioned problems suffer from certain limitations due to the unpredictable, harsh and jarring conditions encountered during shipping and transportation of living flower bulbs. The current art support devices and containers do not adequately limit the movement of medium and nourishing fluid during the transportation of flower bulbs to retailers. Controlling the movement of the medium and nourishing fluid would reduce damage to the bulb and its fragile root system, as well as reduce spillage of liquids in transit. Furthermore, current containers and devices either hinder a user's ability to view and monitor the full transformation of the flowering bulb or they damage the bulb, which can make the bulb susceptible to disease and poor growth.

There is a need to improve such systems to ensure that the health and growth of flower bulbs are not adversely affected during their shipping and transportation to retailers for marketing and sale to a consumer. A container and support device capable of controlling the movement of medium and nourishing fluid would reduce damage to the bulb root systems and moreover prevent fungal and bacterial damage to the plant thereby improving its health and growth. The present disclosure is directed towards an improved container used for the growth of the bulb during transportation, marketing, and display of hydroponically grown flower bulbs.

BRIEF SUMMARY OF THE INVENTION

The present invention is directed to a novel design for a container that ameliorates the conditions in which hydroponically grown flower bulbs are subjected to during storage, display and especially transportation. The inclusion of a nourishing fluid, in the container in which a hydroponically grown flower bulb is shipped is essential to keep the plant alive. A container with the features presented herein will be able to control the movement of a nourishing fluid during transportation without affecting its ability to display the transformation of the flower bulb during growth. The present invention comprises a transparent plastic display pot, a novel single piece support device for securing flower bulbs, and a snap-fit cover to further contain medium and nourishing fluid during transportation. The combination of these components creates a more efficient container for storage, display and especially transportation of hydroponically grown flower bulbs.

The transparent plastic display pot component may contain sets of laterally extending flanges on the inner surface sidewall of the pot. The flanges are located and arranged annularly at a single predetermined distance above the base of the pot. These sets of laterally extending flanges allow a stable, secure and level snap-fit arrangement between the interior of the pot and the support device. Once the support device is snap-fit into place, it separates the transparent pot into two chambers: i) the lower chamber, which contains the nourishing fluid, and ii) the upper chamber, which contains the flower bulbs and its stems and blooms.

The support device component of the invention may be produced from flexible, resilient plastic and contain a plurality of recessed inserts. These recessed inserts can be adapted to secure flower bulbs, such as tulips, lilies, daffodils, and amaryllis by way of non-limiting examples, in an upright position throughout the transformation of the flower bulb during its growth. The recessed inserts have an opening through the bottom surface of the insert to allow the root system to grow and maintain contact with the nourishing fluid. The dimensions of the opening may vary depending on the size of the plant basal and root system. Once the root system of the bulb is placed through the opening, the holes are plugged and further restrict the movement of nutrient solution through the support device into the upper chamber. The support device controls the movement of nourishing fluid by containing the water movement to the lower chamber of the pot. The recessed inserts act as baffles to reduce the wave action of the nourishing fluid as it sloshes during transportation and handling. The water in the lower chamber is substantially unable to crest above the support device after it is fixed in place with a snap-fit arrangement created by the laterally extending flanges on the inner surface sidewall of the transparent display pot. With a minimal amount of nourishing fluid escaping the lower chamber, the flower bulbs remain dry and are less prone to the growth of mold. Furthermore, such containment minimizes the risk of spillage during transport to retailers and consumers.

The support device of the present invention further aids the flower bulb during growth by using a novel design which secures the flowering bulb without causing damage to the bulb caused by pins and other piercing fasteners. The support device has recessed inserts which are capable of receiving flowering bulbs and flexing during bulb growth to accommodate the transformation of the bulb. The recessed inserts may contain expansion joints which provide an improved ability to secure the bulb within the support tray. The bulb's tunic and scales are not pierced when the flowering bulb is secured into the recessed inserts. Nor is the view of the bulb's growth hindered. The support device may be produced from transparent or opaque plastic or other materials known to those of skill in the art. Transparent materials allow an unobstructed view of the growth and development of the flowering bulb and facilitate observing and maintaining proper water level and condition. Fabricating the support device from an opaque material may promote root growth and inhibit algal growth in the nourishing fluid.

The snap-fit cover component of the invention further ensures that nourishing fluid is retained entirely within the container during transportation. The snap-fit cover creates a substantially watertight seal with the transparent display pot. The downwardly extending sidewalls of the opening create a secondary reservoir with the inner surface sidewall of the sidewall of the transparent display pot to retain the nourishing fluid in the container if tipped over or otherwise subject to sudden movements during transportation or handling. The support device will not create an absolutely watertight seal between the lower chamber and the upper chamber, however, any small volume of nourishing fluid that does reach the upper chamber of the transparent pot, especially if it is tipped over, may collect in the reservoir created by the snap-fit cover before draining back into the lower chamber. Furthermore, the snap-fit cover does not need to be removed at any time during the flower bulb's growth. The downwardly extending sidewalls of the cover further assists to support and stabilize the stems of the flowering bulbs as they begin to emerge from the container.

An additional benefit of the presented invention is the simplicity of production. Each component required for assembly may be furnished from a single piece of plastic which can be vacuum formed. Vacuum forming all the required components allows a simplified means for mass production of each component. The simplicity in the design allows for an economical assembly which is attractive to both retailers and consumers. Since hydroponically grown flower bulbs need minimal nourishing fluid for successful growth, the container does not need to support heavy weights. The display pot can be constructed of thin, rigid plastic further reducing the weight of the overall assembly, an additional benefit for transportation and handling. The lower overall weight of each container reduces the cost of transportation, thereby economically benefitting the distributor, retailer and end-purchaser. The present invention solves the challenges of minimizing damage to hydroponically grown flower bulbs during transportation while still simplifying and reducing cost of production.

These and other features, aspects, and advantages of the present invention will become better understood with regard to the following description, appended claims, and accompanying drawings wherein additional benefits and advantages will be appreciated.

DETAILED DESCRIPTION OF THE INVENTION

Figure 1:
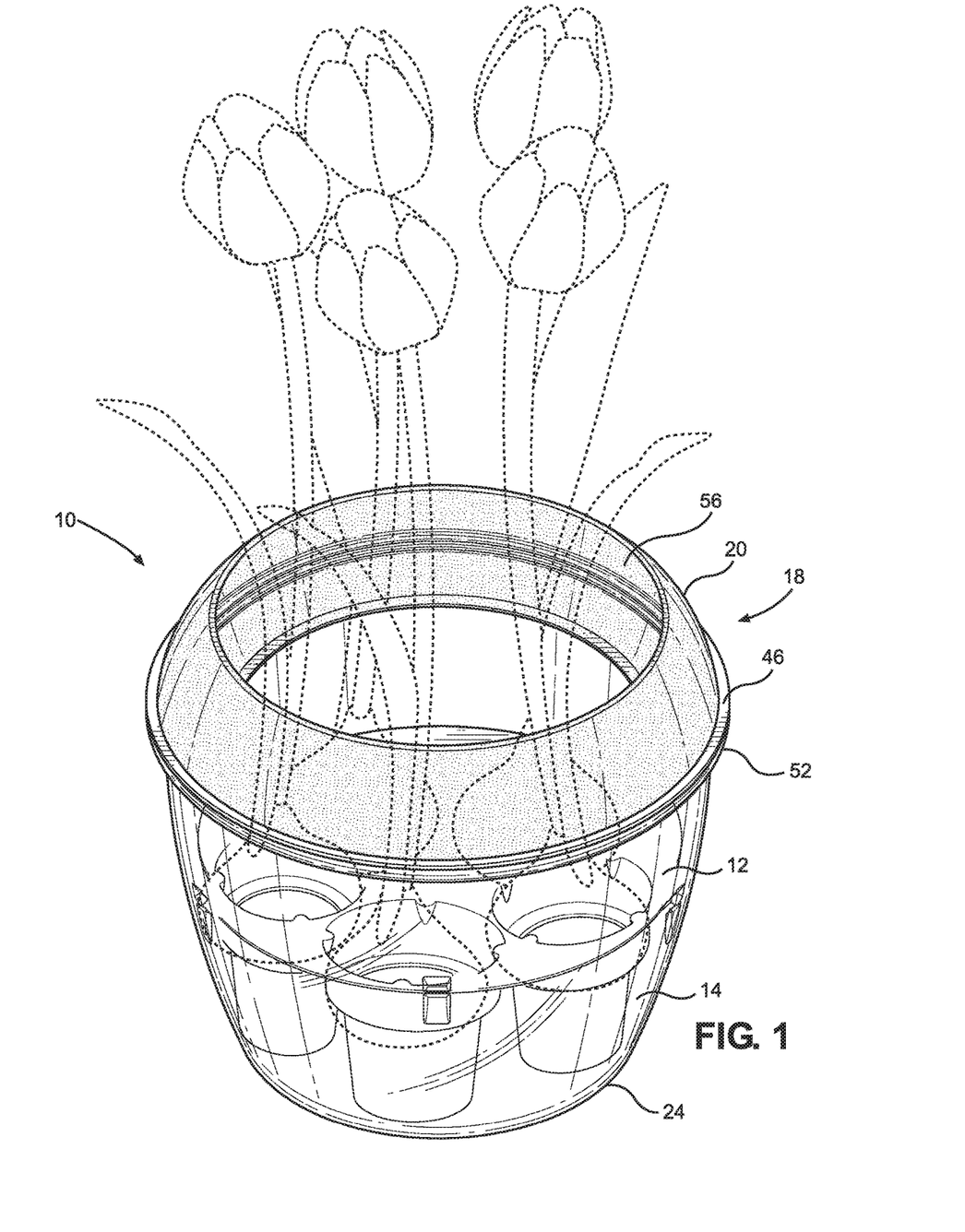
FIG. 1 is an isometric view of an embodiment of a hydroponic container with flowering bulbs shown in broken lines in the support device; the broken lines depict environmental subject matter only and form no part of the claimed device.
Figure 2:
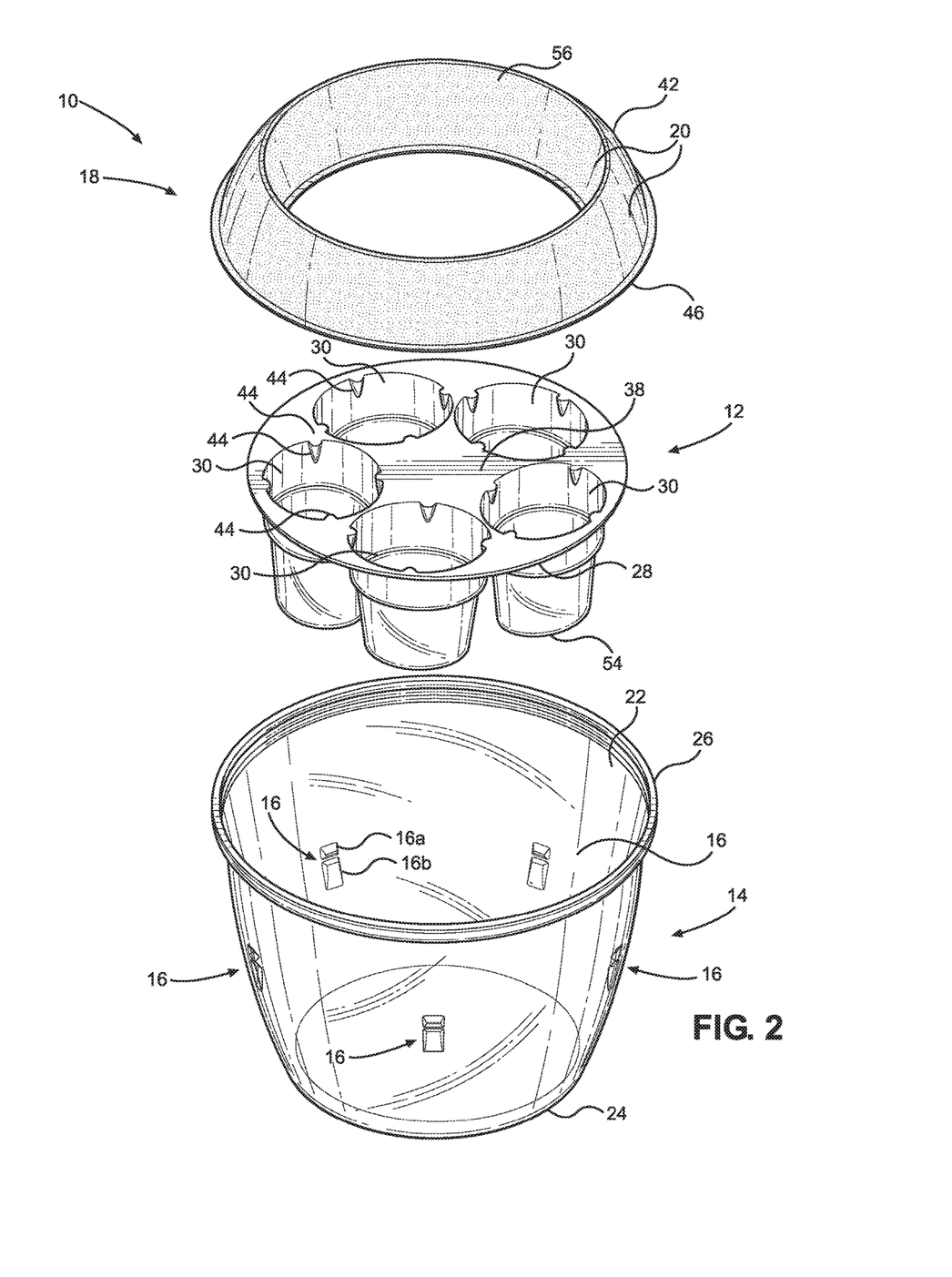
FIG. 2 is an exploded top view of the hydroponic container of FIG. 1.

The preferred embodiment in FIG. 1 shows an exemplary assembly of the hydroponic container 10 of the present disclosure. As shown in FIG. 2, a support device 12 used for containing flowering bulbs is inserted into a transparent plastic pot 14. The transparent pot 14 includes sets of laterally extending flanges 16 to establish an interference-fit or press-fit, also termed a snap-fit arrangement with the support device 12. The support device 12 may be inserted into the transparent pot 14. The flower bulbs can continue their growth in the support device 12 and emerge from a top opening 56 of a snap-fit cover 18. The snap-fit cover 18 creates a substantially watertight seal 52 where it is joined with the transparent pot 14. As shown in FIG. 1, the downwardly extending sidewalls 20 of the snap-fit cover 18 will also provide support to the stems of the maturing flower bulbs. The combination of these components creates an innovative device for transporting, storing and displaying hydroponically grown flowering bulbs.

Although the present invention is not limited to the exemplary embodiment but rather can be made in a variety of sizes, shapes, and heights, an exemplary embodiment is disclosed as shown in FIG. 1. The assembly of this invention comprises a transparent display pot 14, support device 12 with flowering bulbs secured therein, and a cover component 18 having an opening 56 extending through an upper surface thereof. The cover component may be a snap-fit cover coupled to the display pot in an interlocking engagement. The term "snap-fit" is used in a functional sense indicating generally interlocking coupling members fitting together in mating engagement to secure together components with each other. In an exemplary embodiment, the cover employs a snap fit coupling. Such coupling members are readily available, and those of skill in the art are familiar with such couplings. Other interlocking coupling members are available that would be suitable for alternative embodiments of the subject matter of the disclosure, examples of which include interlocking interference fits and rotational engagement members such as twist and lock tabs and recesses, threaded coupling members or any other suitable members for creating a watertight seal between the cover component 18 and the display pot 14. Those skilled in the art will understand that any suitable coupling members, now known or hereafter developed, may be used in coupling together the components described herein.

These components are preferably produced using a vacuum forming process. The simplicity in design of each component allows for vacuum forming, which reduces the overall cost of the production of such a container 10. Vacuum forming is an inexpensive means for mass production which uses plastics such as acrylonitrile-butadiene-styrene (ABS), polystyrene (PS), and polyethylene terephthalate (PET). The selection of appropriate material would be within the ability of a person skilled in the art, who will appreciate that certain qualities of tensile strength or compressibility may be desirable, particularly if a snap-fit arrangement on the container is intended. The display pot 14 preferably is produced from a transparent plastic to allow the consumer to view transformation of the flowering bulbs during their growth and the condition and level of the nourishing fluid. The transparent characteristic of the container 10 further allows ambient light to reach the flowering bulbs to ensure healthy growth of strong stems and beautiful blooms thereby increasing their aesthetic appeal to a purchaser. It is contemplated however, that in other embodiments, an opaque material may be substituted.

Figure 3:
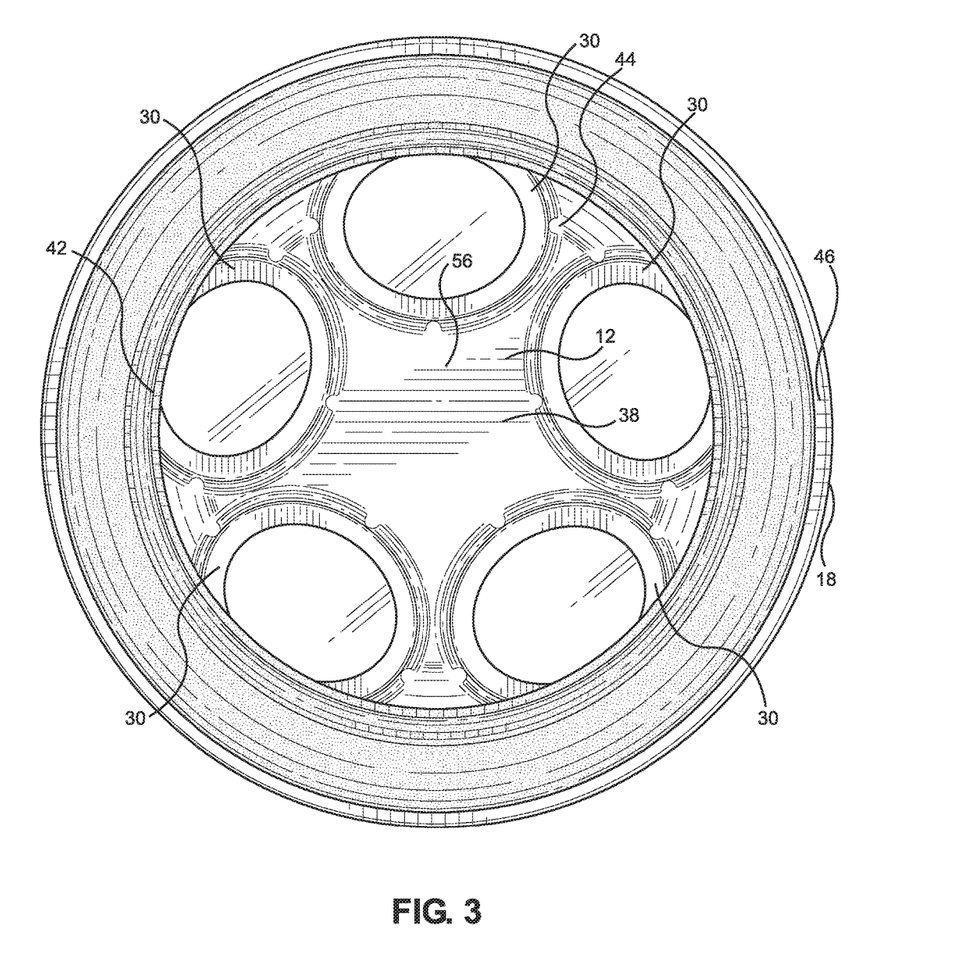
FIG. 3 is a top view of the hydroponic container of FIG. 1.
Figure 4:
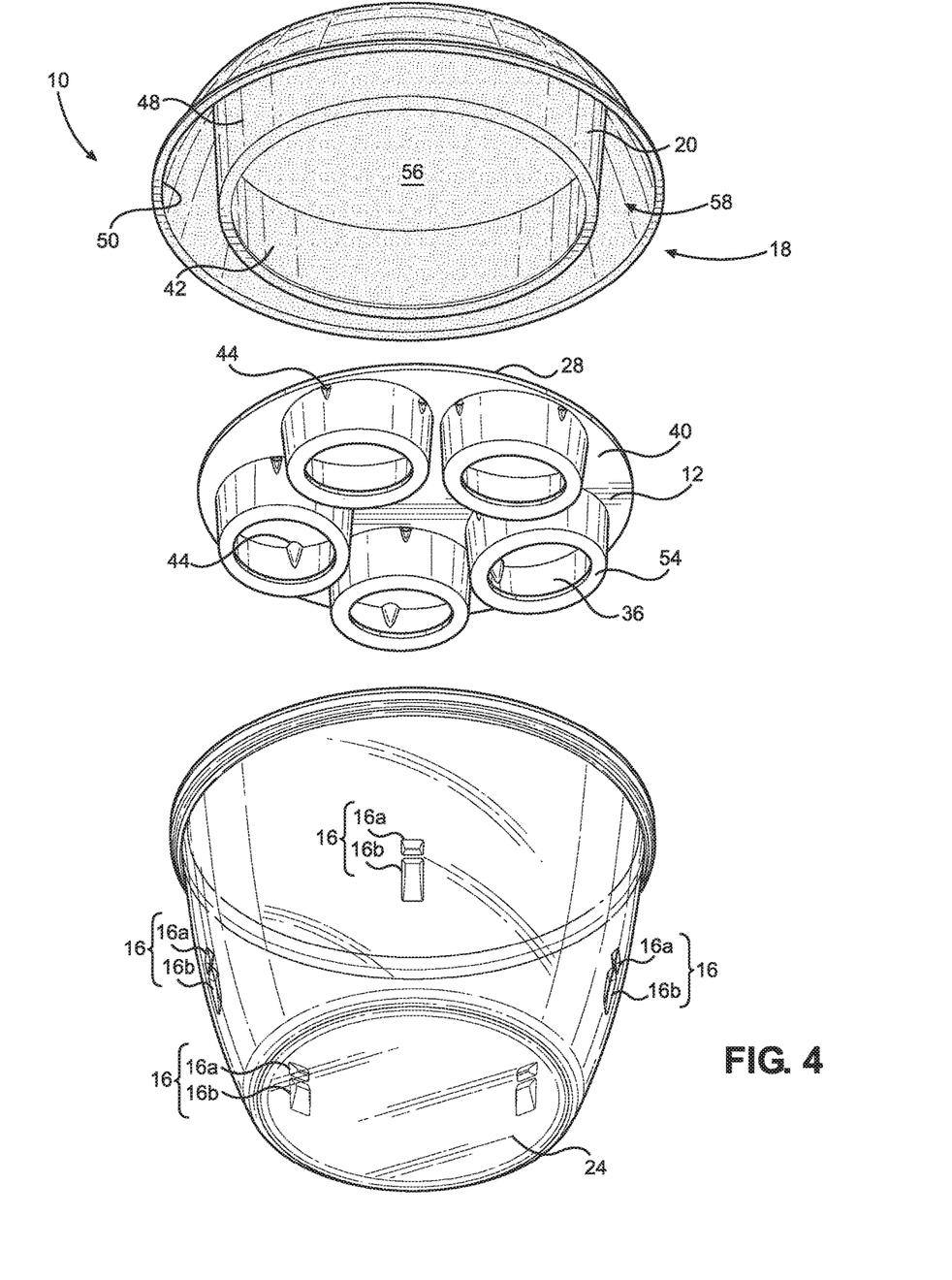
FIG. 4 is an exploded bottom view of the hydroponic container of FIG. 1.
Figure 5:
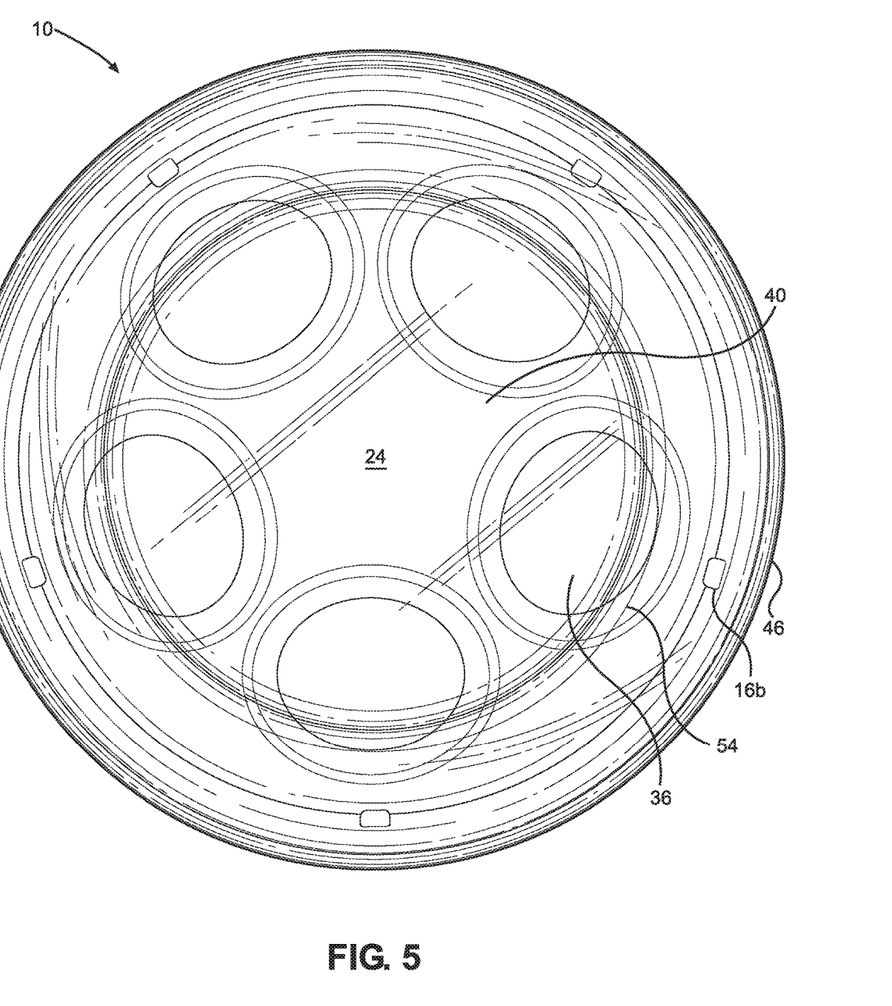
FIG. 5 is a bottom view of the hydroponic container of FIG. 1.

FIGS. 2 and 3 show an exploded top view and a top view respectively of the hydroponic container assembly. FIGS. 4 and 5 show an exploded bottom view and a bottom view respectively of the hydroponic container assembly. FIGS. 6, 7, 8 and 9 show front, rear, left and right side views respectively of the hydroponic container assembly. The views show the snap-fit arrangement created by sets of laterally extending flanges 16 on the inner surface sidewall 22 of the pot 14. As shown in FIGS. 2 and 4, the sets of flanges 16 are arranged in pairs 16a, 16b, vertically spaced, the sets of vertically spaced pairs are arranged annularly on the inner surface 22 of the display pot 14.

Figure 6:
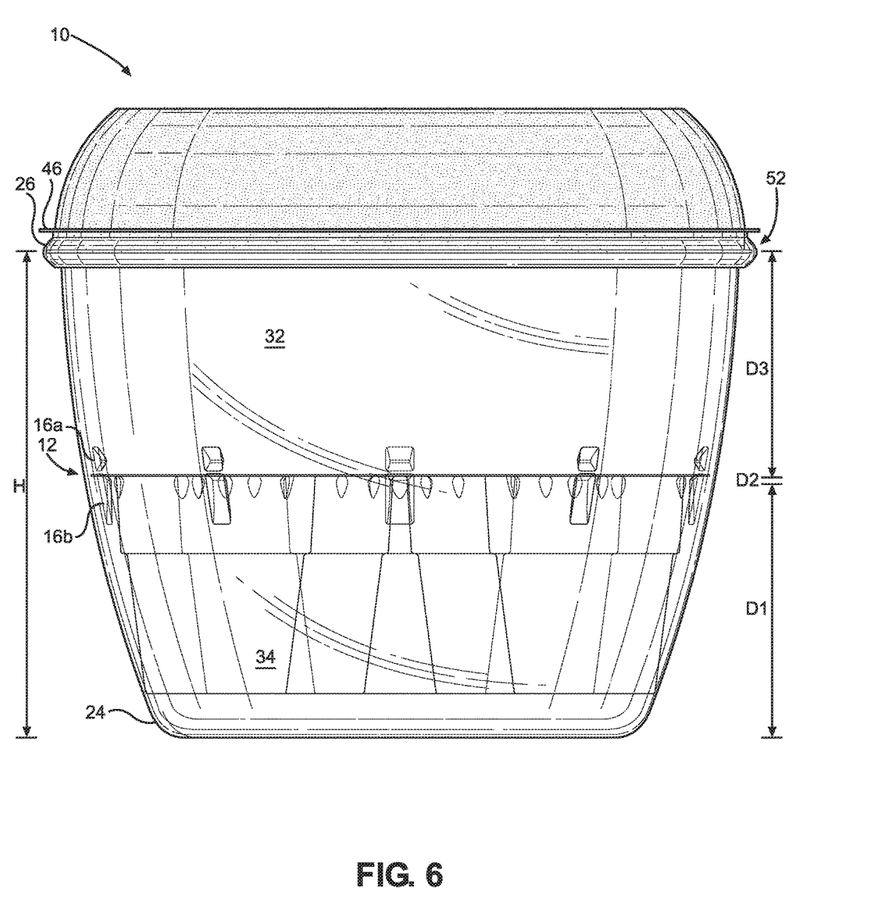
FIG. 6 is a front view of the hydroponic container of FIG. 1.
Figure 7:
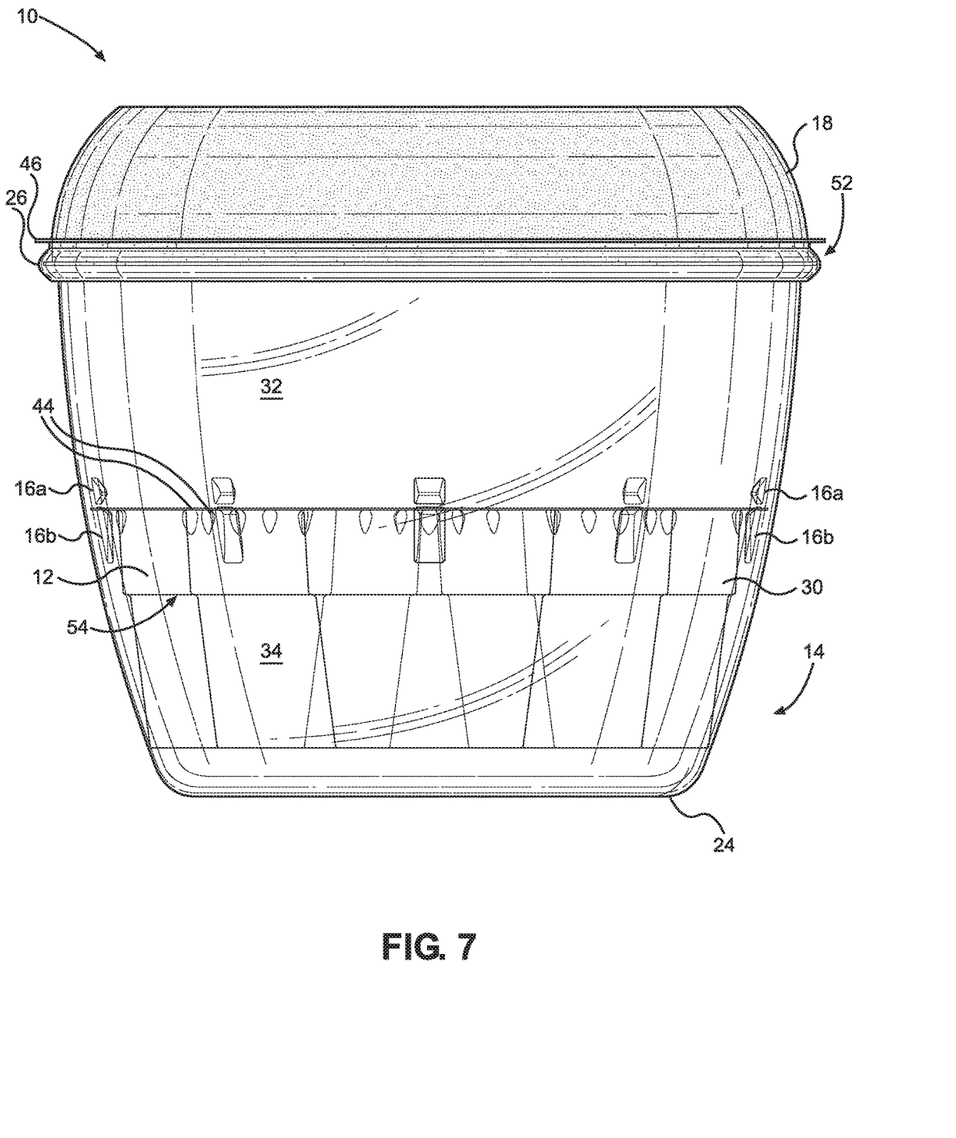
FIG. 7 is a rear view through the transparent pot of an embodiment of the hydroponic container.

As shown in FIG. 6, the display pot 14 has a height H measured from the base 24 to the lip 26 of the display pot. Each set of flanges 16 is located at a single predetermined distance D1, wherein D1 is the distance from the base of the pot 24 to the upper surface of a bottom flange 16b of the sets of flanges 16. The vertical spacing distance in-between the flanges 16a, 16b is referenced at D2, wherein D2 is the distance encompassing the gap between the top flange 16a and the bottom flange 16b of each set 16. D2 is ordinarily slightly greater than the thickness of the outer rim of the support device 28.

Figure 8:
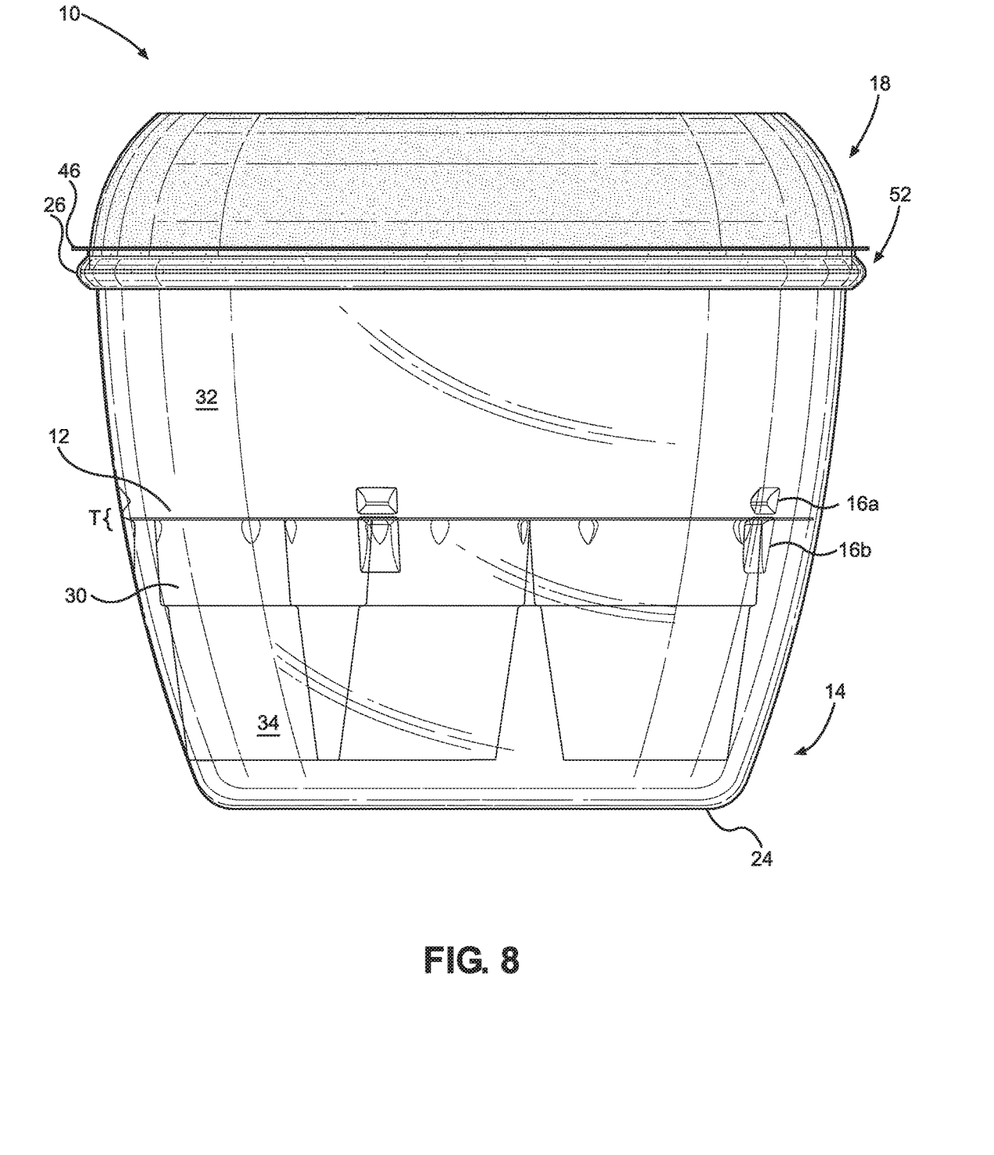
FIG. 8 is a left side view of the hydroponic container of FIG. 1.
Figure 9:
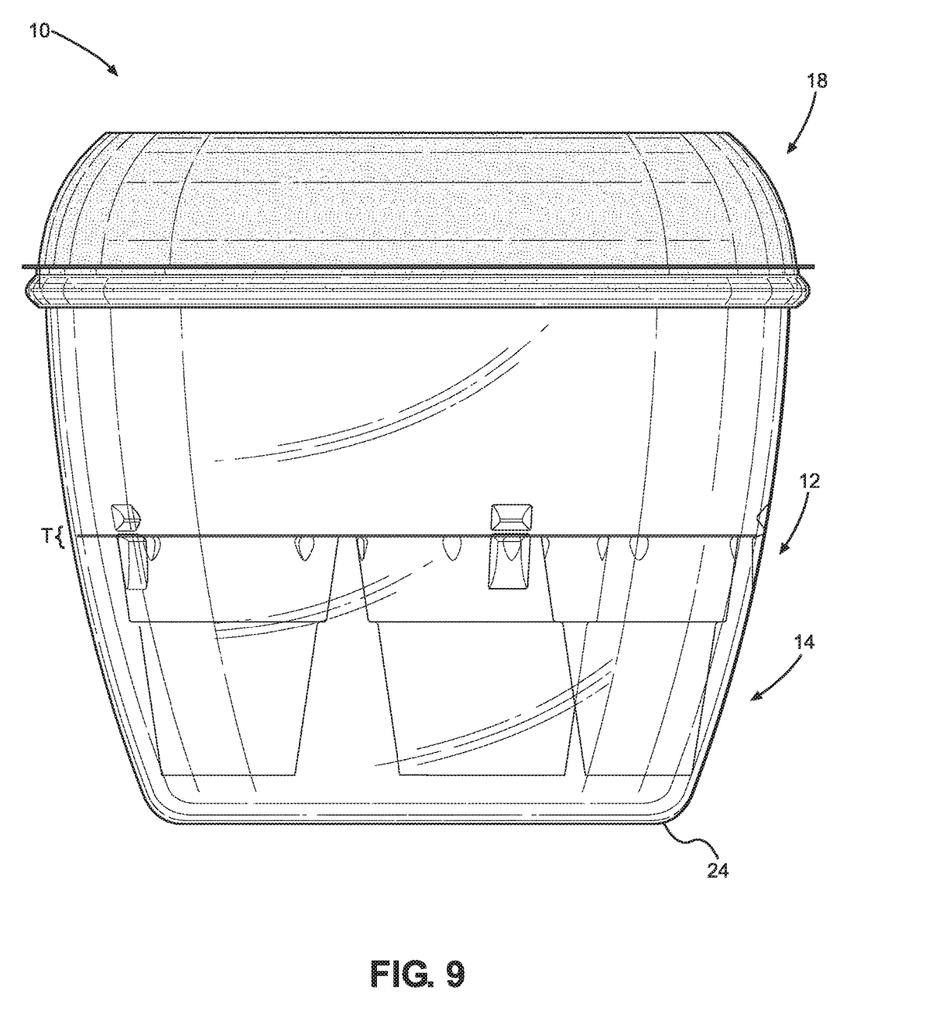
FIG. 9 is a right side view of the hydroponic container of FIG. 1.

As shown in FIGS. 8 and 9, an exemplary embodiment of support device 12 employs a thickness T of the outer rim 28 that is less than the distance D2 such that outer rim 28 may be secured in a snap fit arrangement with the sets of flanges 16. Other structures are available that would be suitable for alternative embodiments of the support device 12 secured in interlocking engagement with the flanges of the display pot 14. Examples of other structures available that would be suitable for alternative embodiments of coupling the support device 12 to the flanges are interference fits, commonly referred to as press fits. When an interference fit is employed, then the external dimension of thickness T of the outer rim 28 of the support device 12 will slightly exceed the internal dimension of distance D2 to press fit and couple the components securely together. Those skilled in the art will appreciate that any suitable coupling fit may be used in obtaining the secure coupling described herein. The outer rim 28 thickness will be greater than the thickness of the material of the recessed inserts 30 to provide lateral support for the device.

The distance from a bottom surface of a top flange 16a to the lip 26 of the display pot 14 is referenced at D3. When the support device 12 is secured in an interlocking engagement with the sets of flanges 16, then the internal compartment of the pot 14 will be separated into two sections: i) an upper chamber 32 and ii) a lower chamber 34. The predetermined distance D1 will determine the volume of the lower chamber 34 while the distance D3 will determine the volume of the upper chamber 32. The total of distances D1, D2 and D3 equal the height H of the display pot.

The nourishing fluid will be contained in the lower chamber 34; the support device 12 reduces the amount of nourishing fluid that enters the upper chamber 32. The volume of the lower chamber 34 is sufficient for the roots to be in direct contact with nutrient solution in order to develop and continue to grow. The root system of the flower bulbs will propagate into the lower chamber 34 through openings 36 extending through a bottom surface 54 of the recessed inserts 30 formed in the support device 12. The bulb roots will encounter and bathe in the nourishing fluid in the lower chamber 34. As the root system propagates into the lower chamber 34, the flower bulb and stem will remain secured in the upper chamber 32. The horizontal partition created by the support device 12 keeps the flower bulb from being soaked by the nourishing fluid, thereby reducing susceptibility to any growth of harmful fungi and bacteria. Maintaining dry flower bulbs also reduces the chances of mold growth and facilitates rich color development in the stems and the blooms. One of skill in the art would be able to determine optimum size and shape containers to accommodate a given variety of flowering plant.

The support device 12 comprises a top surface 38 and bottom surface 40. The support device 12 includes recessed inserts 30 which extend below the top surface 38 of the support device 12 into the lower chamber 32 of the pot. A nourishing fluid, such as water, may be maintained at a level up to the bottom surface 40 of the support device 12. This allows the flowering bulbs root system to be bathed completely in the water while the rest of the bulb remains dry in the upper chamber 32. The recessed inserts 30 act as vertical baffles to reduce turbulence of nourishing fluid during the transportation and handling of the container. Reducing the turbulence of the fluid reduces or eliminates fracture to the fragile root system, thereby reducing the amount of *Trichoderma* spp. fungi released by the bulb. Reducing the amount of fungus in the nourishing fluid enhances the overall health of the root system and aesthetic appeal of the container 10 by providing the consumer with visibly clear nourishing fluid. The support device 12 further reduces the amount of fungal growth on the bulb in the upper chamber 32 by substantially containing the nourishing fluid within the confines of the lower chamber. The nourishing fluid may be water alone or may be water combined with additives to control one or more of the pH and the mineral value, or electrolytic conductivity (EC), of the liquid along with fertilizer to enhance growth.

The top views of the container shown in FIGS. 2 and 3 show an exemplary arrangement of recessed inserts 30. The center of each insert 30 is situated below the opening 56 of the cover component 18. Each insert will hold and secure a flowering bulb in an upright position. This allows the stems of the flowering bulbs to emerge from the container cover component 18 during their growth and blossoming as depicted in FIG. 1. The cover component 18 is adapted to allow each flowering bulb to emerge from the container 10 without the need to remove the cover component 18. The outer surface 42 of the inner downwardly extending sidewalls 20 of the cover component 18 provide support for the stems of the flowering bulbs as they begin to emerge from the top of the container. The pre-assembled hydroponic container requires no further fabrication or set-up thereby reducing time and cost for retailers and consumers thereby providing a more versatile and economically efficient hydroponic growing container 10. Thus, the container provides a simplified gardening product for the increased enjoyment of the consumer.

Each of the recessed inserts 30 may contain several expansion joints 44, which can be seen in FIGS. 2, 3 and 4. The expansion joints 44 provide additional advantages such as, by way of non-limiting examples: securing the bulb in an upright position; preventing damage to the bulb caused by fasteners which pierce it; and providing structural support for the recessed inserts 30. As the bulb is placed into the recessed inserts 30, the expansion joints 44 contact and clamp the bulb firmly into place. The recessed insert 30 can flex and accommodate changes as the bulb size and shape transforms during its growth. The expansion joints 44 expand as a bulb is inserted to relieve stress on the recessed insert 30. Unlike prior art structures, these recessed inserts 30 and expansion joints 44 work together to secure the bulb in an upright position without piercing the tunic and scales of the bulb.

The bottom views of the container in FIGS. 4 and 5 show the position of the laterally extending flanges 16 arranged annularly around the inner surface sidewall 22 of the display pot 14. The distribution of flanges 16 may vary depending on the size of the support device 12. One skilled in the art would be able to determine an optimal number and distribution pattern of flanges 16 for a given container assembly.

FIGS. 2 and 4 show, respectively an exploded top view and exploded bottom view the container 10. In an exemplary embodiment, the transparent display pot 14 is formed with a lip 26 that is adapted and arranged to allow the cover component 18 to mate in a snap-fit engagement. As shown in FIGS. 1-3, an outer rim of the cover component 18 includes a brim formed as a projecting edge 46. The brim projecting edge 46 of the cover component 18 snaps into a cavity created by the lip 26 of the display pot 14 thus forming a substantially watertight seal between the lip 26 of the display pot 14 and the brim projecting edge 46 of the curved outer surface of the downwardly extending sidewalls 20 of the cover 18 as shown in FIG. 2. As shown in FIG. 4, the inner surface 48 of the downwardly extending vertical sidewall 20 of the cover component 18 along with the inner surface of the curved sidewall 50 and with the inner surface sidewall 22 of the pot 14 creates an annular space forming a reservoir that acts to store water and reduce the amount of spillage during transportation and handling. When the container is tipped over or is subjected to unpredictable forces and motion during shipment, the reservoir 58 will collect any sloshed nourishing fluid before it drains back into the lower chamber 34. In addition to preventing the spillage of nourishing fluid during transportation, the downwardly extending vertical sidewalls 20 at the opening 56 of the cover component 18 also provide support for the stems of the flowering bulbs as they begin to emerge from the container.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The invention claimed is:

1. A hydroponic container for transportation, storage and display of bulbous plants comprising:
    a transparent display pot with a base, sidewalls and a top opening;
    a single piece, support device with uniform lateral cross-sectional shape, containing a plurality of recessed inserts and adapted to be inserted into said top opening of said transparent display pot;
    a cover adapted to create a substantially watertight seal with said top opening of said transparent display pot;
    wherein said sidewalls further comprise an inner sidewall surface and an outer sidewall surface and said inner sidewall surface contains sets of laterally extending flanges located at a single predetermined distance above said base of said transparent display pot, said sets of flanges further arranged in vertically spaced pairs and;
    wherein said support device comprises a rigid outer rim and said recessed inserts comprise deformable, resilient plastic;
    wherein said recessed inserts comprise expansion joints; and
    wherein said cover comprises a curved outer surface sidewall and an opening; whereby said curved outer surface sidewall and said opening create a hollow shell cavity for retaining contents of said hydroponic container.

2. The hydroponic container as recited in claim 1, wherein said rigid outer rim of said support device is adapted to establish a snap-fit arrangement with said laterally extending flanges of said inner sidewall surface.

3. The hydroponic container as recited in claim 1, wherein said support device and said recessed inserts provide baffles thereby reducing turbulence and movement of fluids within said display pot during transportation of said hydroponic container.

4. The hydroponic container as recited in claim 1, wherein said cover further comprises a vertical sidewall, whereby said curved outer surface sidewall and said vertical sidewall create a reservoir.

5. The hydroponic container as recited in claim 1, wherein said cover comprises a reservoir.

6. The hydroponic container as recited in claim 1, wherein a center of each of said recessed inserts of said support device is situated below said opening of said cover component.

7. A hydroponic container assembly for the transportation, storage and display of bulbous plants comprising:
    a transparent display pot with a base, sidewalls, top opening and lip;
    a single piece, support device containing a plurality of recessed inserts and adapted to be inserted into said top opening of said transparent display pot;
    a cover component adapted to create a substantially watertight seal with said lip of said transparent display pot; and
    a volume of nourishing fluid, wherein said volume of nourishing fluid contacts root growth of said bulbous plants;
    wherein said sidewalls further comprise an inner sidewall surface and outer sidewall surface and said inner sidewall surface contains sets of laterally extending flanges located at a constant predetermined distance above said base of said transparent display pot;
    wherein said support device comprises a rigid outer rim and said recessed inserts comprise deformable, resilient plastic;
    wherein said recessed inserts further comprise expansion joints;
    wherein said cover component further comprises sidewalls formed with a downwardly extending vertical sidewall whereby an opening is created in said cover component; and
    wherein said cover component further comprises sidewalls formed with an upwardly curved sidewall comprising a curved inner surface and a curved outer surface and said curved inner surface creates a hollow cavity with said downwardly extending vertical sidewalls whereby a reservoir is created in said cover component.

8. The hydroponic container assembly as recited in claim 7, wherein said rigid outer rim of said support device is adapted to establish a snap-fit arrangement with said laterally extending sets of flanges of said inner sidewall surface, said sets of flanges arranged in pairs vertically spaced, and whereby a lower chamber is created below said support device and an upper chamber is created above said support device and said reservoir is created above said upper chamber.

9. The hydroponic container assembly as recited in claim 7, wherein a center of each of said recessed inserts of said support device is situated below said opening of said cover component.

10. The hydroponic container assembly as recited in claim 7, wherein said support device and said recessed inserts provide baffles thereby reducing turbulence and movement of nourishing fluid contained in said lower chamber.

11. The hydroponic container assembly as recited in claim 7, wherein said transparent display pot, said support device, said expansion joints, and said cover component are manufactured from vacuum formed plastic.

* * * * *